US008013562B2

(12) United States Patent
Gan et al.

(10) Patent No.: US 8,013,562 B2
(45) Date of Patent: Sep. 6, 2011

(54) DRIVING MECHANISM HAVING POSITION ENCODER FOR TWO-DIMENSIONAL POSITIONING

(75) Inventors: Wai Chuen Gan, Kwai Chung (HK); Gary Peter Widdowson, Kwai Chung (HK); Shiqiang Yao, Kwai Chung (HK); Siu Yan Ho, Kwai Chung (HK); Hon Yu Peter Ng, Kwai Chung (HK)

(73) Assignee: ASM Assembly Automation Ltd, Hong Kong (CN)

( * ) Notice: Subject to any disclaimer, the term of this patent is extended or adjusted under 35 U.S.C. 154(b) by 76 days.

(21) Appl. No.: 12/555,871

(22) Filed: Sep. 9, 2009

(65) Prior Publication Data
US 2010/0060086 A1   Mar. 11, 2010

Related U.S. Application Data

(63) Continuation-in-part of application No. 12/206,831, filed on Sep. 9, 2008.

(51) Int. Cl.
*B64C 17/06* (2006.01)

(52) U.S. Cl. .......... 318/649; 318/601; 318/480
(58) Field of Classification Search .......... 318/649, 318/601, 480; 700/275; 327/365
See application file for complete search history.

(56) References Cited

U.S. PATENT DOCUMENTS

| | | | |
|---|---|---|---|
| 5,757,182 A | 5/1998 | Kitazawa | |
| 6,765,195 B1 | 7/2004 | Leviton | |
| 7,038,334 B2 | 5/2006 | Botos et al. | |
| 2003/0137908 A1* | 7/2003 | Sakamoto et al. | 369/47.1 |
| 2005/0238752 A1* | 10/2005 | Toncelli | 425/447 |

* cited by examiner

*Primary Examiner* — Karen Masih
(74) *Attorney, Agent, or Firm* — Ostrolenk Faber LLP

(57) ABSTRACT

A driving mechanism comprises a fixed housing, a movable housing on which an object to be driven is mounted and a driving motor which is operative to drive the movable housing to move linearly as well as to rotate relative to the fixed housing. An inductance-type encoder determines both linear and rotary displacement of the movable housing relative to the fixed housing, whereby to provide closed-loop control of the position of the object in both linear and rotary directions.

7 Claims, 6 Drawing Sheets

DRIVING MECHANISM HAVING POSITION ENCODER FOR TWO-DIMENSIONAL POSITIONING

FIELD OF THE INVENTION

The invention relates to a driving mechanism for positioning objects in two dimensions, and in particular to a driving mechanism with a position encoder to allow controlled positioning by the driving mechanism in two dimensions during operation.

BACKGROUND AND PRIOR ART

Certain driving mechanisms for driving objects such as camera lenses need to be capable of accurately positioning the object in at least two dimensions, such as in the rotary and linear directions, during operation. Usually, the linear and angular positions of rotary-linear driving mechanism can be determined by optical means. For example, U.S. Pat. No. 6,765,195 entitled "Method and Apparatus for Two-Dimensional Absolute Optical Encoding" describes an optical encoder for determining the position of an object in two dimensions. The encoder comprises a scale having a pattern being predetermined to indicate an absolute location on the scale, means for illuminating the scale, means for forming an image of the pattern, detector means for outputting signals and analyzing means for determining the absolute location of the object in two directions. From the scale and pattern, the position of the object is known, and the driving mechanism may thus control the movement of the object in two dimensions.

However, optical encoders are generally bulky and expensive to use. In particular, much space is required for installing the encoder lens assembly as well as an optical scale to detect the position of the object. For a compact apparatus where installation space is at a premium, an optical encoder is not desirable.

Another type of encoder uses an inductance-type sensor which does not need optical means to detect the position of an object. An example of such an encoder is disclosed in U.S. Pat. No. 5,757,182 entitled "Variable-Reluctance-Type Angular Rotation Sensor with Sinusoidally Distributed Winding". In this set-up, sinusoidally distributed windings are formed on uniformly-distributed slots such that the angular position of the driven object can be determined using variable-reluctance principles. However, such inductance sensors have conventionally not been able to detect the position of an object in two directions, such as both angular displacement as well as linear displacement. Accordingly, the driving mechanisms incorporating inductance-type position encoders are operative to provide controlled driving of an object only in one direction, specifically the rotary direction. It would be desirable to provide an inductance-type encoder that is more compact than an optical encoder and is able to detect the position of an object in two dimensions. Such a driving mechanism may provide controlled driving of an object in two dimensions, especially in applications which require the driving mechanism to move an object linearly as well as to rotate the object.

Moreover, present motors providing both rotary and linear motions require two sets of coils and magnets to provide the rotational torque and linear motion force. This also requires two drivers to drive the respective sets of coils and magnets, all of which increase component count and costs. For example, U.S. Pat. No. 7,038,334 entitled "High Precision Laser Machining Apparatus" describes how to use a rotary motor and a separate linear motor to provide rotary and linear motions respectively.

SUMMARY OF THE INVENTION

It is thus an object of the invention to seek to avoid the disadvantages of an optical encoder by providing an inductance-type encoder which can detect rotary as well as linear displacement of an object by a driving mechanism which drives the object in two directions.

It is another object of the invention to provide a motor wherein rotary and linear motions of the motor can be produced independently using one set of coils and magnets to decrease component count and cost as compared to conventional rotary-linear motors.

According to a first aspect of the invention, there is provided a driving mechanism comprising: a fixed housing; a movable housing on which an object to be driven is mounted; a driving motor which is operative to drive the movable housing to move linearly as well as to rotate relative to the fixed housing; and an inductance-type encoder operative to determine both linear and rotary displacement of the movable housing relative to the fixed housing, whereby to provide closed-loop control of the position of the object in both linear and rotary directions.

According to a second aspect of the invention, there is provided a driving mechanism for a motor comprising: a magnet assembly; a fixed housing spaced from the magnet assembly to form a gap for generating magnetic flux lines between the fixed housing and the magnet assembly in the gap; and a coil assembly comprising multiple coils disposed in the gap which is operative to electromagnetically interact with the magnetic flux lines to cause the coil assembly and the magnet assembly both to move linearly relative to each other between a first linear position and a second linear position, and to rotate relative to each other at both the first and second linear positions; wherein part of the coil assembly is configured to extend beyond the magnet assembly and be located outside the magnetic flux lines at both the said first and second linear positions.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

An example of an apparatus according to the preferred embodiment of the invention will now be described with reference to the accompanying drawings, in which.

DETAILED DESCRIPTION OF THE PREFERRED EMBODIMENT OF THE INVENTION

Figure 1:
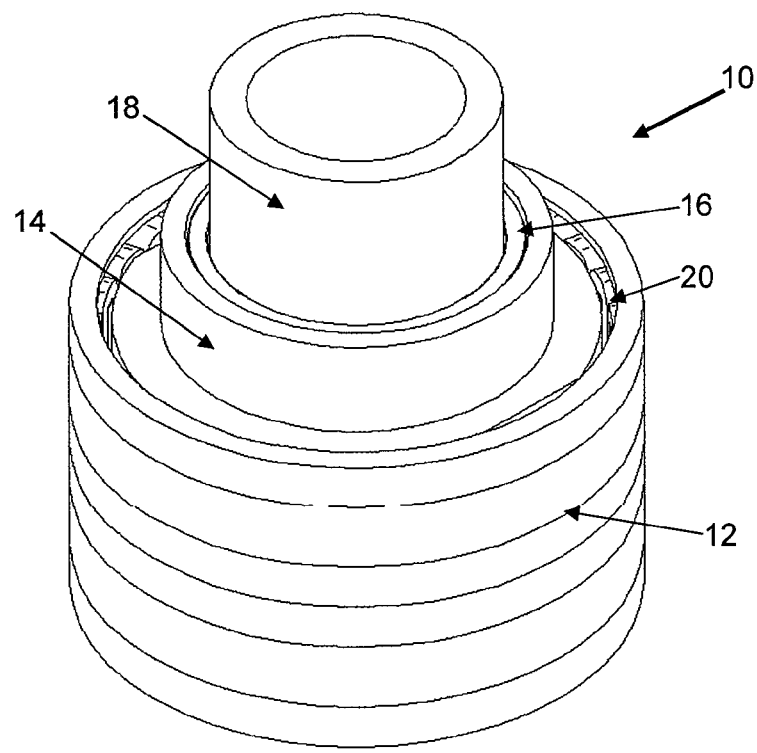
FIG. 1 is an isometric view of one end of the driving mechanism according to the preferred embodiment of the invention which incorporates an inductance-type encoder.

FIG. 1 is an isometric view of one end of the driving mechanism 10 according to the preferred embodiment of the invention which incorporates an inductance-type encoder. The driving mechanism 10 generally comprises a fixed housing 12, a movable housing 14 for mounting an object to be driven, such as an optical lens system, linear-rotary bearings 16 and a centrally-located central cylinder 18. The driving mechanism 10 also comprises resolver coils 20 comprised in the induction-type encoder.

Figure 2:
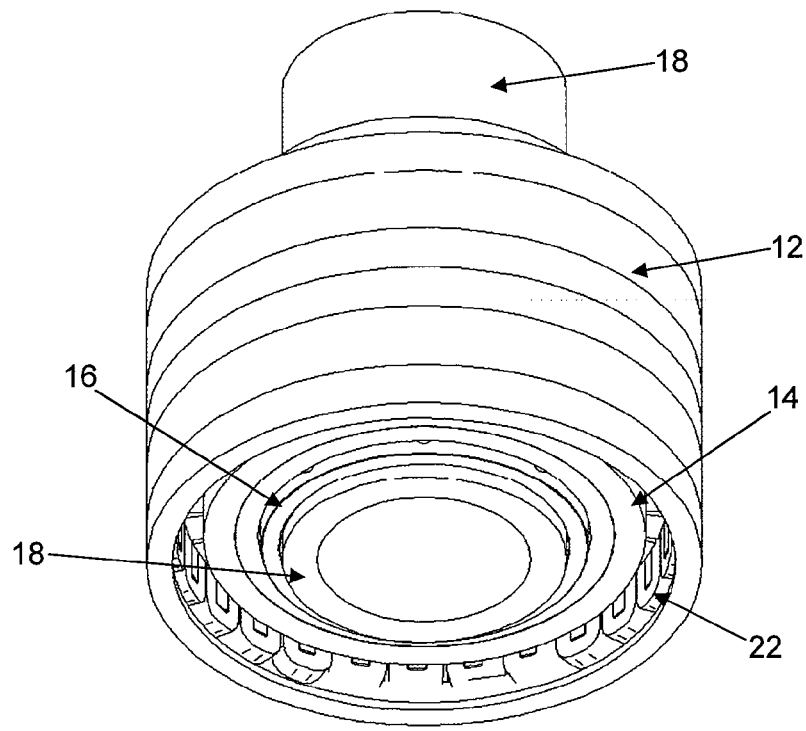
FIG. 2 is an isometric view of another end of the driving mechanism opposite to that shown in FIG. 1.

FIG. 2 is an isometric view of another end of the driving mechanism 10 opposite to that shown in FIG. 1. It further illustrates driving motor stator coils 22 of a driving motor, such as a servo motor mounted on the fixed housing 12, for driving the movable housing 14 to move relative to the central cylinder 18. The driving motor is operative to drive the movable housing 14 to move linearly as well as to rotate relative to the fixed housing 12.

Figure 3:
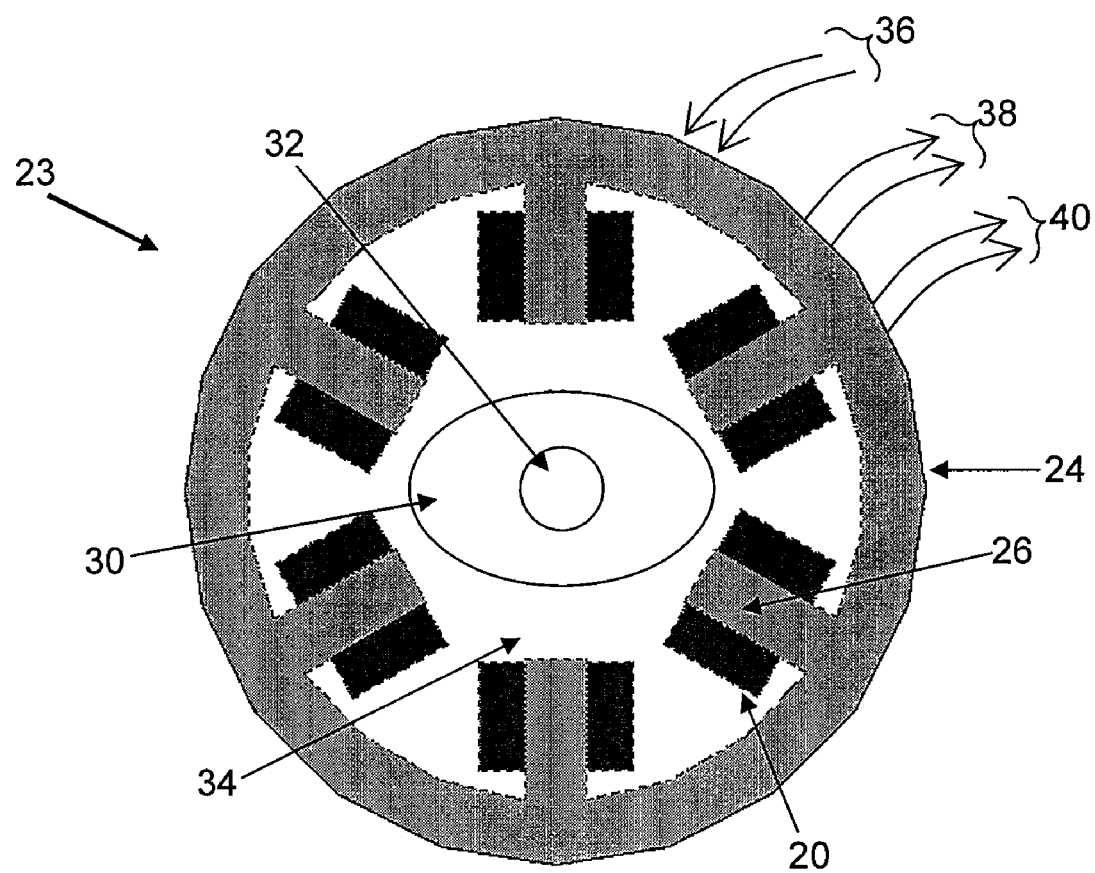
FIG. 3 is a cross-sectional view of a coil winding structure associated with a slotted resolver comprised in the inductance-type encoder.

FIG. 3 is a cross-sectional view of a coil winding structure associated with a slotted resolver 23 comprised in the inductance-type encoder. The said inductance-type encoder is operative to determine both linear and rotary displacement of the movable housing relative to the fixed housing, whereby to provide closed-loop control of the position of the object in both linear and rotary directions.

The slotted resolver 23 includes an encoder stator 24 which has a plurality of poles 26 extending inwardly from the encoder stator 24. A laminated core 30, preferably made of iron, is located centrally of the encoder stator 24 and is rotatable with respect to the poles 26. It has an inner hole 32 at its center for connecting wires or other peripherals to the object to be driven. An air gap 34 is formed between the laminated core 30 and poles 26, within which the laminated core 30 is rotatable. The slotted resolver 23 may be attached to either of the fixed housing 12 and movable housing 14, and the laminated core may be attached to the other of the fixed housing 12 and movable housing 14.

The resolver coils 20 are wound around the poles 26. At least one resolver coil (such as two resolver coils 20 and two poles 26) is meant for transmitting excitation signals, at least one resolver coil (such as two resolver coils 20 and two poles 26) is meant for picking up Sine signals which are generated depending on a position of the laminated core 30, and at least one resolver coil (such as the two remaining resolver coils 20 and two poles 26) is meant for picking up Cosine signals which are generated depending on the position of the laminated core 30. The total number of resolver coils 20 is preferably equal to 3n, where n is an integer greater than or equal to 1. The resolver coils 20 for transmitting excitation signals receive current from excitation cables 36, the resolver coils 20 for picking up Sine signals transmit current through Sine cables 38 and the resolver coils 20 for picking up Cosine signals transmit current through Cosine cables 40.

Figure 4:
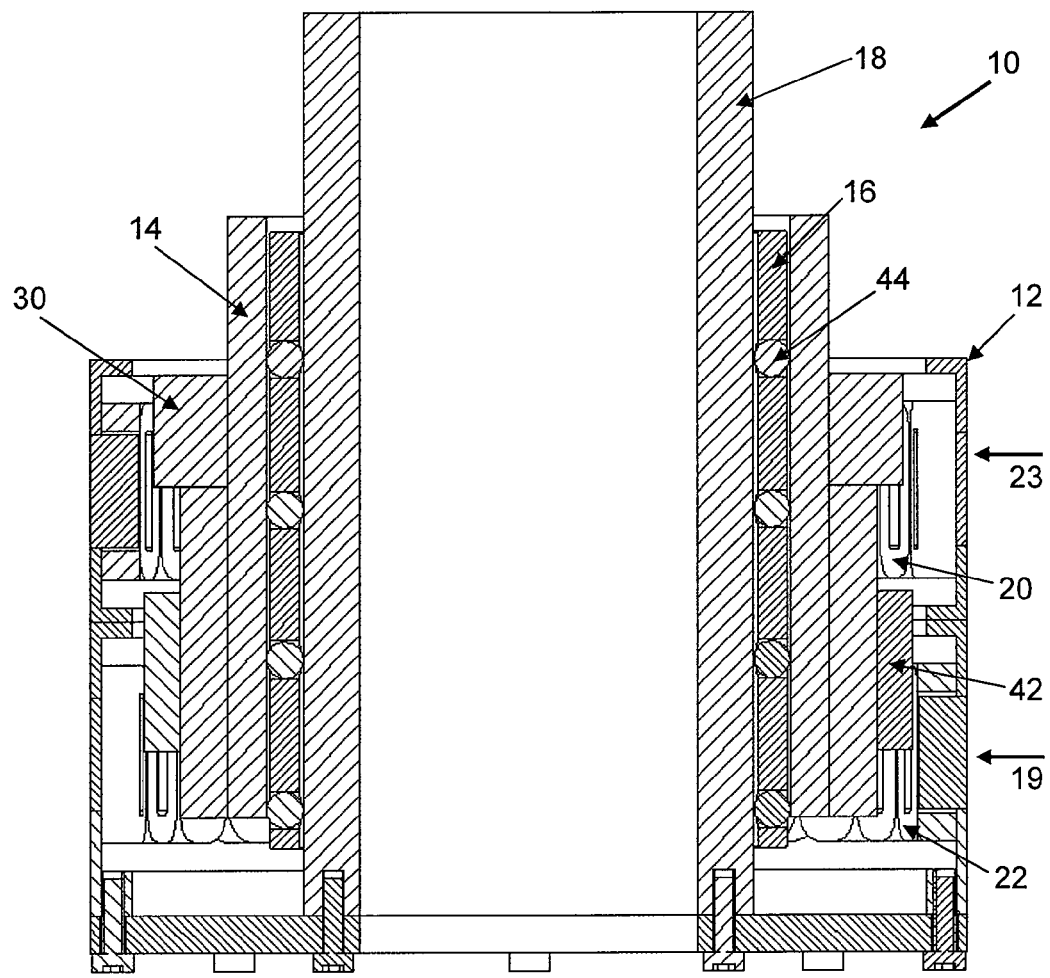
FIG. 4 is a cross-sectional view of a movable housing of the driving mechanism at a first position.

FIG. 4 is a cross-sectional view of the driving mechanism 10 wherein the movable housing 14 is at a first position relative to the central cylinder 18. The servo motor 19 includes the driving motor stator coils 22 which are attached to the fixed housing 12, and driving motor permanent magnets 42 which are attached to the movable housing 14. Conversely, the driving motor coils may be attached to the movable housing 14 and the driving motor permanent magnets may be attached to the fixed housing 12. The driving motor permanent magnets 42 are operative to electromagnetically interact with the driving motor stator coils 22 to drive the movable housing 14 to move linearly with respect to the fixed housing 12, as well as to rotate relative to the fixed housing 12, as will be explained in further detail below.

The movable housing 14 is slidably supported on the central cylinder 18, and the linear-rotary bearings 16 are located between the movable housing 14 and the central cylinder 18. As the movable housing 14 moves, rollers 44 in the linear-rotary bearings 16 allow the movable housing 14 together with the linear-rotary bearings 16 to slide relative to the central cylinder 18, as well as relative to the fixed housing 12. Accordingly, an object mounted to the movable housing 14, such as an optical lens, may be driven to move linearly with respect to the fixed housing 12 and central cylinder 18, and may also rotate relative thereto, whereby to control linear and rotary motions of the object. This is as opposed to the aforesaid prior art driving mechanism including an inductance-type encoder, which only offers controlled rotary motion (but not linear motion) to the movable part of the driving mechanism. Furthermore, the central cylinder 18 may comprise a hollow center for locating wires and other peripherals for connection to the object.

As described above, the slotted resolver 23 comprises the resolver coils 20 and laminated core 30. As the movable housing 14 moves, it will also drive the laminated core 30 to move by a corresponding extent. Thus, the electrical signals picked up by the Sine coils 38 and Cosine coils 40 may be used to determine both the linear and rotary positions of the movable housing 14, thereby enabling closed-loop control of the position of the movable housing 14.

Figure 5:
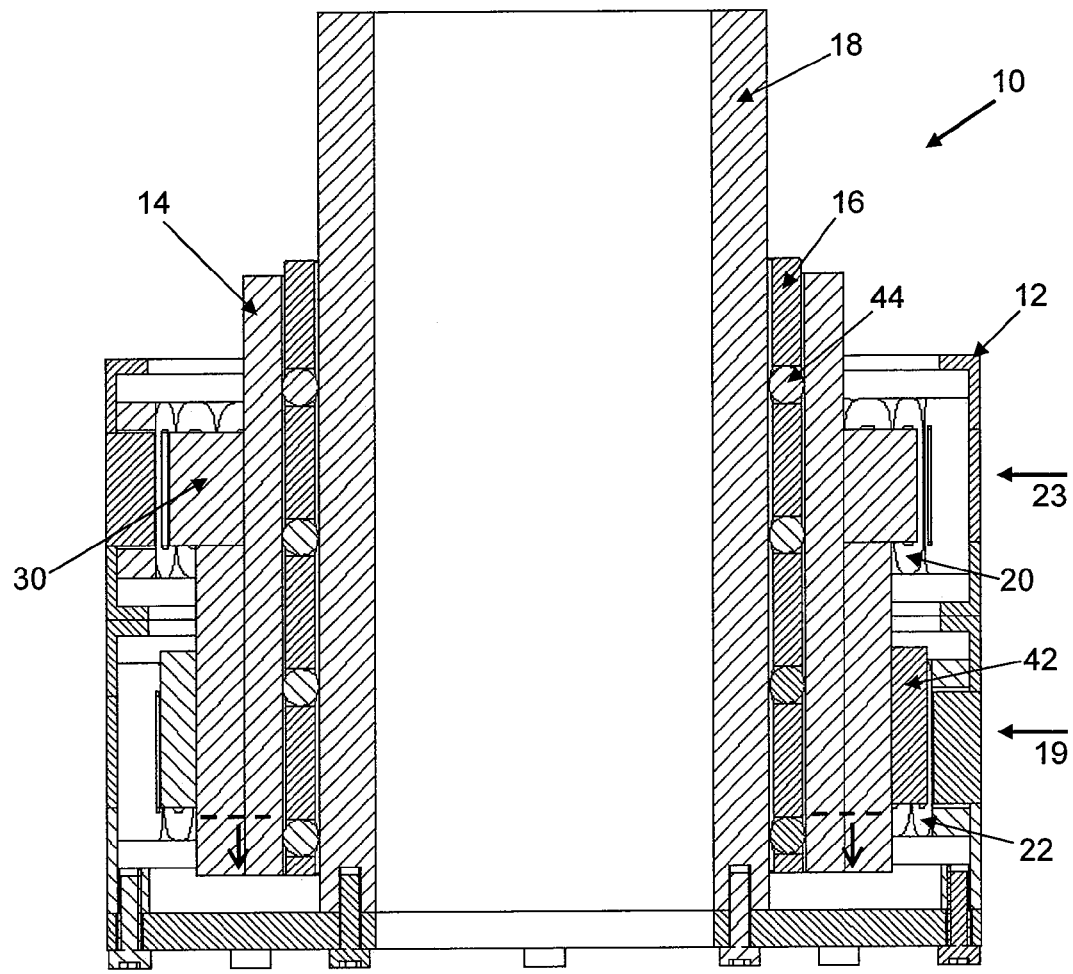
FIG. 5 is a cross-sectional view of the movable housing of the driving mechanism at a second position.

FIG. 5 is a cross-sectional view of the movable housing 14 of the driving mechanism 10 at a second position. The movable housing 14 and linear-rotary bearings 16 have moved to the second position from the first position by sliding along the central cylinder 18. The driving motor permanent magnets 42 and the laminated core 30 have moved relative to the driving motor stator coils 22 and resolver coils 20 respectively. The movement of the laminated core 30 allows the extent of linear and rotary motion of the movable housing 14 to be calculated.

An exemplary method of calculating the extent of movement of the movable housing 14 from the readings obtained from the Sine coils 38 and Cosine coils 40 is set out below.

The Excitation Signal sent through the excitation coils 36 may be expressed as:

$E(t) = A_e \sin \omega_o t$, where $E(t)$ is a voltage carried by the primary winding, $A_e$ is the amplitude of the excitation signal, $w_o$ is the frequency of the excitation signal, and t is the time domain.

The Sine and Cosine signals picked up by the respective Sine and Cosine coils 38, 40 may be expressed as:

$$S_1(t) = a(z) \sin \theta \sin \omega_o t$$

$$S_2(t) = a(z) \cos \theta \sin \omega_o t$$

where $a(z)$ is the z-axis position information and $\theta$ is the angular position.

The SIN output windings and the COS output windings of the resolver coils 20 have a phase difference comprising an electrical angle of 90° therebetween. The rotary angle θ of the laminated core 30 may thus be determined with the above formulae.

To determine the vertical, z position, of the movable housing 14, the picked-up signals $S_1(t)$ and $S_2(t)$ are passed through an all-pass filter with a 90-degree phase shift, which may be implemented using an operational amplifier. Resultant signals $S_3(t)$ and $S_4(t)$ are obtained:

$$S_1(t)=a(z)\sin\theta\sin\omega_o t$$

$$S_2(t)=a(z)\sin\theta\cos\omega_o t$$

$$S_3(t)=a(z)\cos\theta\sin\omega_o t$$

$$S_4(t)=a(z)\cos\theta\cos\omega_o t$$

Analogue multiplications and summations are then performed as follows:

$$y_z(t)=S_1^2(t)+S_2^2(t)+S_3^2(t)+S_4^2(t)$$

$$y_z(t)=2a^2(z)$$

The z-axis position information can finally be decoded with a Digital Signal Processor (DSP) using the formula:

$$a(z)=\sqrt{\frac{y_z(t)}{2}}$$

The Excitation, Sine and Cosine signals can be sent to a Resolver-to-Digital (R/D) Converter for calculating the rotational angle information. The above output signal a(z) contains only the z-axis position information using the slotted resolver 23, which is independent of the rotational angle information calculated using the same slotted resolver 23.

Accordingly, with the above rotary angle θ and z-axis position a(z) obtained, two-dimensional positional information may be obtained for the driving mechanism 10, to allow the driving mechanism 10 to control movement of the object in both the linear and rotary directions using an inductance-type encoder as described above.

Figure 6:
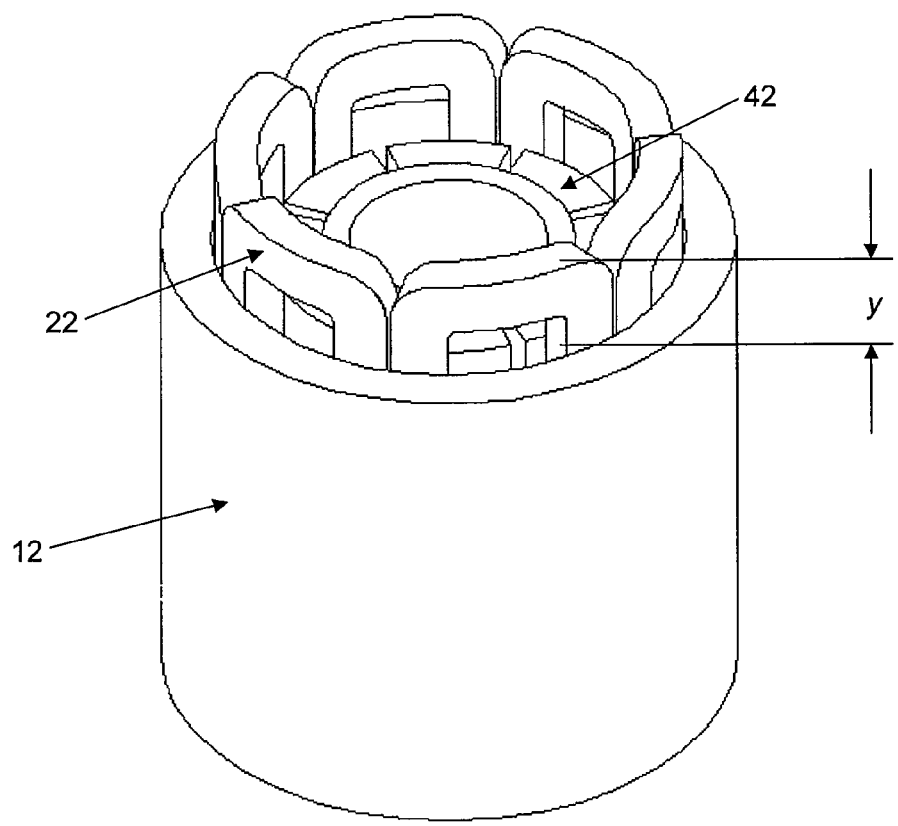
FIG. 6 is a simplified isometric view of a magnet assembly and coil assembly of a rotary-linear motor according to an alternative embodiment of the invention.

FIG. 6 is a simplified isometric view of a magnet assembly and coil assembly of a rotary-linear motor according to an alternative embodiment of the invention. In this embodiment, the magnet assembly in the form of a centrally-located driving motor permanent magnet 42 is relatively fixed whereas the coil assembly in the form of a driving motor coil 22 is configured to be movable with respect to the driving motor permanent magnet 42. The driving motor coil 22 surrounds the driving motor permanent magnet 42 and is movable within a gap which is enclosed by the fixed housing 12. Magnetic flux lines are generated between the driving motor permanent magnet 42 and the fixed housing 12, which comprises iron.

The driving motor coil 22 comprises a set of multiple-phase coils, preferably three-phase coils. The number of coils comprised in the multiple-phase coils would be equal to the number of phases multiplied by the number of coils included in each phase. It should also be noted from FIG. 6 that a part, y, of the driving motor coil 22 extends beyond the driving motor permanent magnet 42 and is not overlapped by the driving motor permanent magnet 42. As a result, the part y of the driving motor coil 22 does not interact with the magnetic flux lines generated between the driving motor permanent magnet 42 and the fixed housing 12. This feature enables the driving motor coil 22 to electromagnetically interact with the magnetic flux lines from the driving motor permanent magnet 42 to generate torque on the driving motor coil 22 so as to cause the driving motor coil 22 to rotate.

When the driving motor coil 22 moves linearly to first and second positions, a part of the coil 22 is not overlapped by the driving motor permanent magnet 42 at both the first and second positions. This enables rotary motion to be generated at both the first and second positions. It is preferable that a part of the driving motor coil 22 that is not overlapped by the driving motor permanent magnet 42, and is located outside the magnetic flux lines at both first and second linear end positions of relative linear motion between the driving motor coil 22 and the driving motor permanent magnet 42, such that a non-overlapped part occurs throughout a range of motion of the driving motor.

Figure 7:
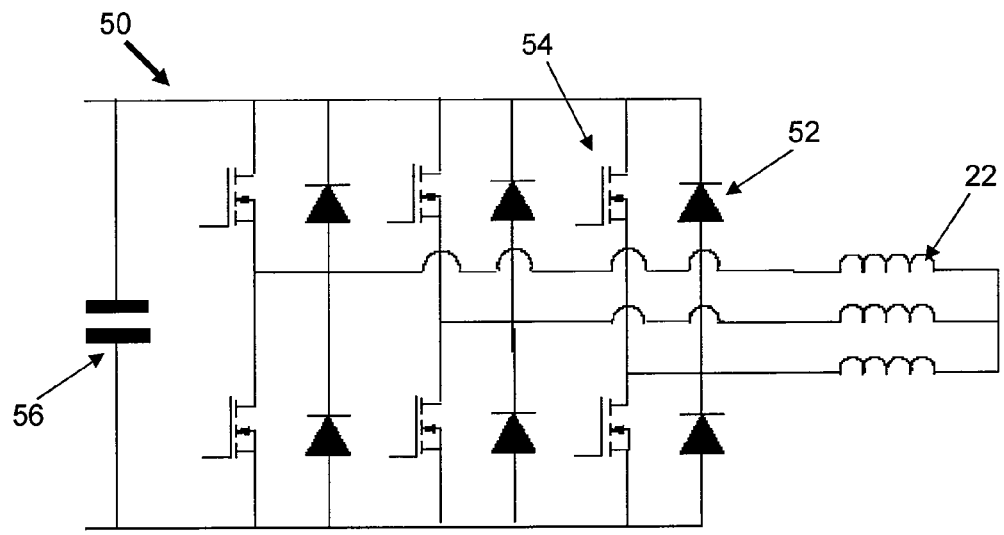
FIG. 7 is an exemplary circuit diagram of a motor driver that is applicable for producing linear and rotary forces in the driving motor.

FIG. 7 is an exemplary circuit diagram 50 of a motor driver that is applicable for producing linear and rotary forces in the driving motor. The set of three driving motor coils 22 are arranged and separated into three phases in a star arrangement wherein the coils 22 are connected to a common connection point. They may also be arranged in a delta arrangement where they are connected in a triangular fashion at multiple connection points. The circuit diagram 50 further comprises diodes 52, power switches 54 and a capacitor 56.

The following equations have been derived for the control of the linear-rotary motor according to the preferred embodiment of the invention:

In the Rotary Axis:

$$T_\theta = i_a k_\theta \frac{l-y}{l}\cos\theta + i_b k_\theta \frac{l-y}{l}\cos\left(\theta-\frac{2\pi}{3}\right) + i_c k_\theta \frac{l-y}{l}\cos\left(\theta+\frac{2\pi}{3}\right)$$

where $T_\theta$ is the rotary axis torque, θ is the rotational angle, $i_a, i_b, i_c$ are the three phase currents, $k_\theta$ is the rotary axis torque constant, l is the total length of the coil and y is the non-overlapping length between the coil and the magnet as illustrated in FIG. 6.

In the Linear Axis:

$$f_z = i_a k_z \sin\theta + i_b k_z \sin\left(\theta-\frac{2\pi}{3}\right) + i_c k_z \sin\left(\theta+\frac{2\pi}{3}\right)$$

where $f_z$ is the linear axis force and $k_z$ is the linear axis force constant.

1. If we set $$i_a = I_q \frac{l}{l-y}\cos\theta,$$

$$i_b = I_q \frac{l}{l-y}\cos\left(\theta-\frac{2\pi}{3}\right),$$

$$i_c = I_q \frac{l}{l-y}\cos\left(\theta+\frac{2\pi}{3}\right),$$

where $I_q$ is a control variable, we get $$T_\theta = k_\theta I_q \text{ and } f_z=0.$$

2. If we set $$i_a = I_d \sin\theta,$$

-continued $$i_b = I_d \sin\left(\theta - \frac{2\pi}{3}\right),$$

$$i_c = I_d \sin\left(\theta + \frac{2\pi}{3}\right),$$

where $I_d$ is a control variable, we get $T_\theta = 0$ and $f_z = k_z I_d$.

Therefore, by the superposition principle, we can control the torque in the rotary axis and the force in the linear axis independently using:

$$i_a = I_d \sin\theta + I_q \frac{l}{l-y} \cos\theta,$$

$$i_b = I_d \sin\left(\theta - \frac{2\pi}{3}\right) + I_q \frac{l}{l-y} \cos\left(\theta - \frac{2\pi}{3}\right),$$

$$i_c = I_d \sin\left(\theta + \frac{2\pi}{3}\right) + I_q \frac{l}{l-y} \cos\left(\theta + \frac{2\pi}{3}\right)$$

and the final generated torque and linear force are equal to:

$T_\theta = k_\theta I_q$ and $f_z = k_z I_d$.

Accordingly, the phased currents flowing through the same set of driving motor coils 22 may provide both linear and torque forces required for the rotary-linear motor.

Figure 8:
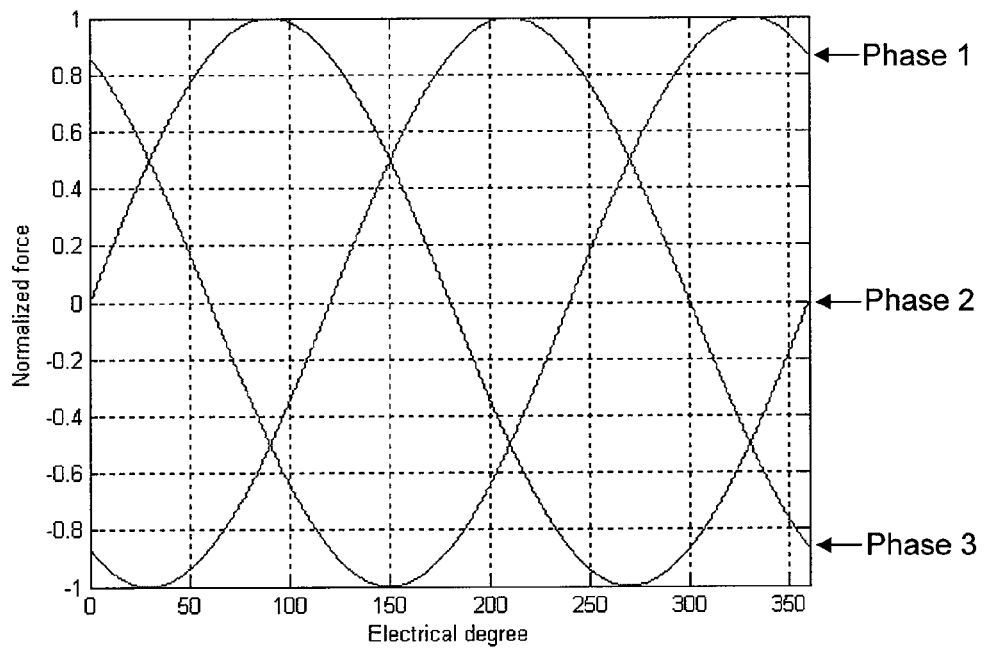
FIGS. 8 and 9 are exemplary force and torque diagrams respectively illustrating the normalized forces respectively produced by each phase of three-phase currents at various electrical angles for driving respective linear and rotary motions of the driving motor.
Figure 9:
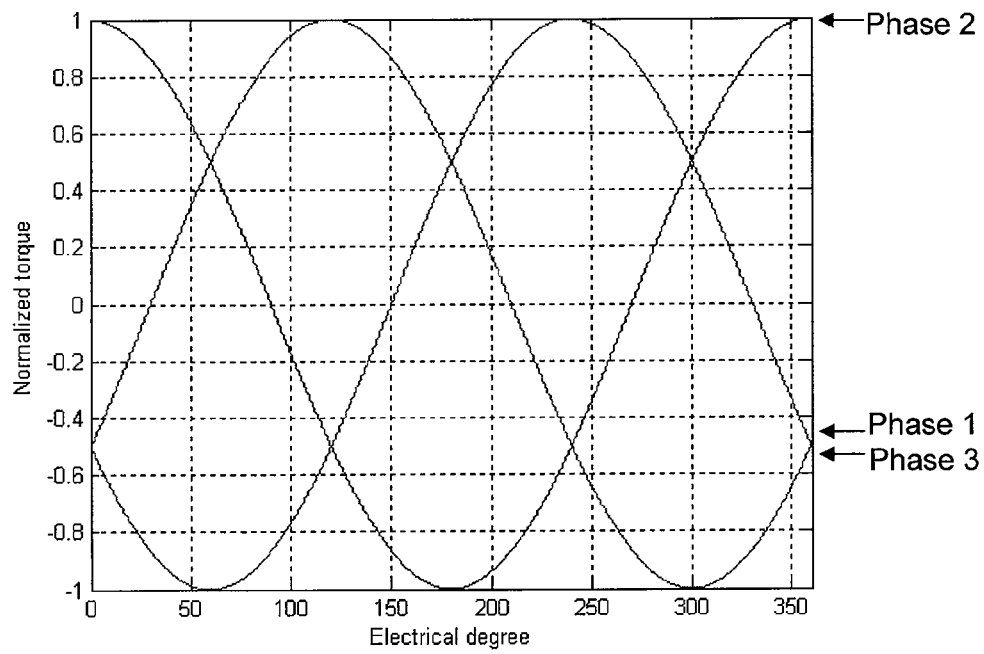

FIG. 8 is an exemplary force diagram illustrating the normalized forces produced by each phase of the three-phase currents at various electrical angles for driving linear motion of the driving motor. FIG. 9 is an exemplary torque diagram illustrating the normalized forces produced by each phase of the three-phase currents at various electrical angles for driving rotary motion of the driving motor. The graphs show that linear and torque forces are produced at each electrical degree by the combination of the three-phase currents through electrical interaction between the same set of driving motor coils 22 and the driving motor permanent magnet 42.

With one set of coils and magnets, the rotary-linear motor in accordance with the preferred embodiment of the invention can provide both rotational and linear motions simultaneously. Together with the inductance-type encoder, there will be no wire attached to the moving part if a moving-magnet configuration is used. At the same time, simultaneous rotary and linear motion can be generated, monitored and controlled independently and accurately.

The invention described herein is susceptible to variations, modifications and/or addition other than those specifically described and it is to be understood that the invention includes all such variations, modifications and/or additions which fall within the spirit and scope of the above description.

The invention claimed is:

1. A driving mechanism for a motor comprising:
    a magnet assembly;
        a fixed housing spaced from the magnet assembly to form a gap for generating magnetic flux lines between the fixed housing and the magnet assembly in the gap; and
    a coil assembly comprising multiple coils disposed in the gap which is operative to electromagnetically interact with the magnetic flux lines to cause the coil assembly and the magnet assembly both to move linearly relative to each other between a first linear position and a second linear position, and to rotate relative to each other at both the first and second linear positions;
        wherein part of the coil assembly is configured to extend beyond the magnet assembly and be located outside the magnetic flux lines at both the said first and second linear positions.

2. The motor as claimed in claim 1, wherein the first and second linear positions are linear end positions moved during relative linear motion between the coil assembly and the magnet assembly.

3. The motor as claimed in claim 1, wherein the coil assembly is relatively fixed and the magnet assembly is movable relative to the coil assembly.

4. The motor as claimed in claim 1, wherein the magnet assembly is relatively fixed and the coil assembly is movable relative to the magnet assembly.

5. The motor as claimed in claim 1, wherein the multiple coils of the coil assembly form a three-phase coil assembly.

6. The motor as claimed in claim 5, wherein the multiple coils of the three-phase coil assembly are connected in a star connection.

7. The motor as claimed in claim 1, wherein the magnet assembly is centrally-located and the coil assembly surrounds the magnet assembly.

* * * * *